United States Patent [19]

Jones

[11] 4,352,677

[45] Oct. 5, 1982

[54] REGULATOR FOR GAS AND AIR MIXTURE

[76] Inventor: James S. Jones, 45 Crown Pl., Richardson, Tex. 75080

[21] Appl. No.: 196,196

[22] Filed: Oct. 14, 1980

[51] Int. Cl.³ .......................................... F02M 23/04
[52] U.S. Cl. ................................. 48/180 C; 48/184
[58] Field of Search ............... 48/184, 180 C; 137/506

[56] References Cited

U.S. PATENT DOCUMENTS 2,073,298 3/1937 Ensign .................................... 48/184
2,894,829 7/1959 Harrison et al. ....................... 48/184

Primary Examiner—Richard V. Fisher
Attorney, Agent, or Firm—Richards, Harris & Medlock

[57] ABSTRACT

A device (10) is provided for controlling the mixture of a gas with air in response to a vacuum drawing the air into a venturi (20). Housing (12) has a bore (14) therein for conveying the gas to the venturi (20). A main valve (30) is disposed in the bore (14) for controlling the flow of gas from a pressurized source. Structure forms a third chamber (68) having a control diaphragm (70) which divides the third chamber (86). One side of the diaphragm (70) is connected to the source of the gas, and the other side is connected upstream of the venturi (20). Structure forms a second chamber (60) with an amplifier diaphragm (74) dividing the second chamber (60) which amplifies the variations in pressure. Structure includes a main diaphragm (86) in fluid communication with the second chamber (60) for actuating the main valve (30) in response to amplified variations in the gas pressure.

12 Claims, 3 Drawing Figures

REGULATOR FOR GAS AND AIR MIXTURE

TECHNICAL FIELD

This invention relates to devices for mixing fuel gas and more particularly, to a regulator for mixing a pressurized fuel gas with air, for supplying the mixture to an internal combustion engine.

BACKGROUND ART

Vehicles are powered by internal combustion engines which operate on gasoline mixed with air in a carburetor. Vacuum from the engine draws gasoline through a venturi structure for atomization. The gasoline and air mixture is then drawn into the engine for ignition.

Demands for fuel efficiency and anticipated scarcity of liquid fuels derived from petroleum has led to a search for other fuels which can be used instead of gasoline. Some potential alternatives include gaseous, volatile fuels such as propane, butane, methane, compressed or liquified natural gas.

The use of vehicles operating on alternate fuels, natural gas or LP gas as the primary fuel, with gasoline being the alternate fuel, should be limited to operations where the equipment is lightly loaded such as taxicabs, delivery vans, pickups, etc. The inherent loss of volumetric efficiency of the engine, due to the vapor density difference between the gaseous fuels and gasoline as well as the heat input required in the intake manifold for gasifying the gasoline, reduces the performance reserve at the maximum engine demand.

Many simple, small gasoline carburetors can be altered to receive gaseous fuels without upsetting the gasoline operation. More complex systems such as two-barrel and four-barrel carburetors, usually require the use of adapters. The use of solenoids on both the gasoline line and the gaseous fuel line with a selector switch in the driver compartment provides a simple convenient means for the operator to change from one fuel to the other.

To allow the operation of the alternate fuel system (gasoline) with a minimum adverse effect on the system, the adapters require large air capacities. The venturi signals from such adapters are quite low and require either a very sensitive fuel device for starting and idling or complex support systems to provide these functions.

DISCLOSURE OF THE INVENTION

In accordance with the present invention, a regulator is provided for mixing pressurized fuel gas with air, which mixture is then applied to an internal combustion engine. The flow of gas is controlled in response to a vacuum. A conduit applies the vacuum with a source of gas, with a main valve disposed in the conduit for regulating the gas flow. A diaphragm in fluid communication with the conduit actuates the main valve in response to changes in the vacuum.

BRIEF DESCRIPTION OF DRAWINGS

A more complete understanding of the invention and its advantages will be apparent from the following detailed description taken in conjunction with the accompanying drawings in which.

DETAILED DESCRIPTION

Figure 1:
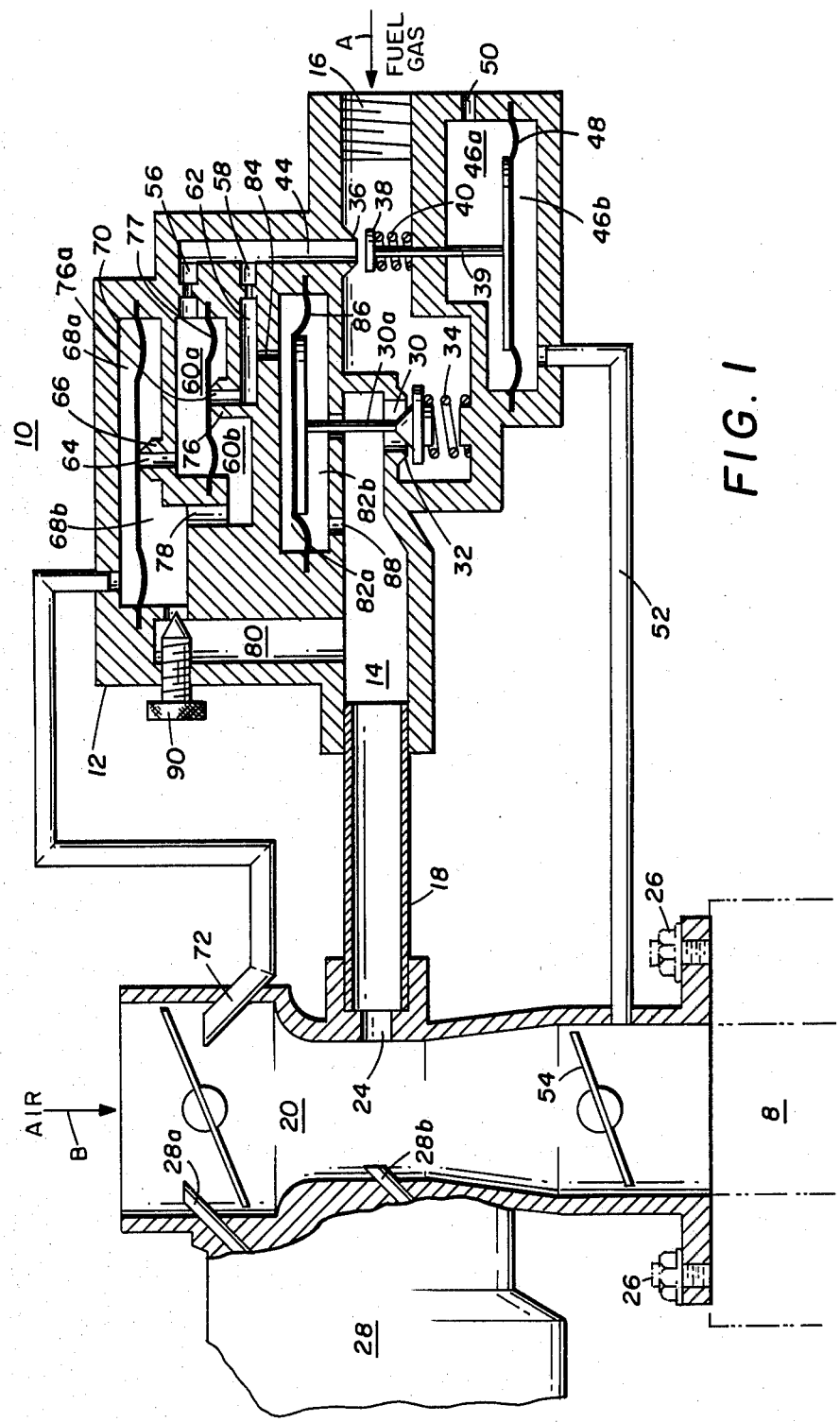
FIG. 1 is a sectional view of one embodiment of the present invention suitable for small carburetors.

FIG. 1 illustrates a regulator 10 which is to serve to mix air with fuel gas. The regulator 10 comprises a housing 12 which contains control elements to be described. Fuel gas to be regulated by regulator 10 is supplied as indicated by arrow A under pressure from a suitable source (not shown), but which is to be connected to the inlet 16. A passage 14 extends from inlet 16 and is connected by way of conduit 18 which leads to a fuel orifice 24 in a venturi throat structure 20. Air is supplied to the venturi structure from its upper end as indicated by arrow B.

A conventional carburetor 28 is also connected to throat 20 by way of tubes 28a and 28b. The venturi structure 20 is then secured as by bolts 26 to the fuel inlet structure of an internal combustion engine 8.

Housing 12 of regulator 10 includes a main fuel valve 30 which operates to open and close the passage at valve seat 32. Valve 30 is normally biased closed by spring 34. Fuel gas entering port 16 is controlled by the action of the valve 30. A pilot fuel valve 38 is positioned adjacent to the inlet 16 and upstream of the main valve 30. The pilot fuel valve 38 is normally biased closed on a seat 36 by action of a spring 40. Valve 38 acts to open and close a passage 44 leading from seat 36. Passage 44 is connected by way of a flow restricting pilot orifice 58 leading to a flow channel and by way of a flow restricting pilot orifice 56 to an upper chamber 60a. Fuel valve 30 is provided with a valve stem 30a which is connected to a main fuel valve diaphragm 86. A chamber 82a is formed in housing 12 above diaphragm 86. Chamber 82a is flow connected by way of restriction 84 to passage 62. A lower chamber 82b is formed in housing 12 below diaphragm 86 and is flow connected by passage 88 to channel 14.

Channel 62 leading from flow restriction 58 extends to a valve seat 76 which cooperates with an amplifier diaphragm 77. Diaphragm 77 separates under chamber 60a from lower chamber 60b. Lower chamber 60b is connected by way of passage 78 to a chamber 68b below a diaphragm 70. An upper chamber 68a is formed in housing 12 above diaphragm 70. Chamber 68b below diaphragm 70 is connected by way of a passage in which trim adjusting screw 90 is provided and leads to the passage 80 which connects to passage 14.

The chamber 68a above a control diaphragm 70 is connected by way of conduit 72 to the input of venturi 20. Control diaphragm 70 cooperates with a valve seat 66 to open and close the passage leading from the upper chamber 60a associated with amplifier diaphragm 77. Valve stem 39 connected to the second valve 38 is coupled to a disc-diaphragm unit 48. Thus, a chamber 46a is formed in housing 12 above diaphragm 48 and a chamber 46b is formed in housing 12 below diaphragm 48. Chamber 46a is connected to atmosphere by way of opening 50. Chamber 46b is connected to the lower end of venturi 20 by way of passage 52.

A butterfly valve 54 is located in throat 20 above the entrance of passage 52 and below the entrance of orifice 24.

In operation, the control device 10, having fuel inlet 16 and fuel valve 30, closed by spring 34, prevents the flow of fuel to outlet 14. A vacuum responsive diaphragm 48 opens pilot fuel valve 38, which normally is closed by spring 40. As the engine 8 demands fuel, engine vacuum acting through conduit 52, displaces the air beneath the diaphragm 48, unseating valve 38. This allows pressurized fuel to flow through the pilot orifices 56 and 58, from passage 44. The pilot charge across orifice 58 is throttled at seat 76 by amplifier diaphragm 77. The pilot charge across orifice 56 is throttled at seat 66 by the control diaphragm 70. The control diaphragm 70 is a very sensitive light diaphragm with its upper portion exposed to the free air flowing to the engine by way of conduit 72 and its bottom side exposed to the fuel flowing to the engine through passage 80 past the trim adjustment 90. The weight of the control diaphragm 70 acting on seat 66 places ample back pressure on the pilot charge across orifice 56 to open the main fuel valve 30, with the main fuel valve diaphragm 86 using the pilot charge across orifice 58. Under all operating conditions, the pressure difference across the control diaphragm 70 is the pressure difference required to float diaphragm 70. The pilot charge will never equal or exceed the engine's fuel demand at idle; there will always be fuel flowing by the main fuel valve 30 at idle. The trim adjustment is provided with screw 90 to restrict the pilot charge. The quantity of the pilot charge is constant and it all must pass adjusting screw 90; therefore, the fuel delivery pressure at outlet 14 is the air pressure acting on top of control diaphragm 70, plus the pressure difference required to float diaphragm 70, minus the pressure difference across screw 90 created by the pilot fuel velocity across screw 90.

If a pressure difference of 0.020 inches water is required to float control diaphragm 70 and if the idle screw 90 is so set to provide a pressure drop of 0.008 inches of water, there would be a positive pressure of 0.012 inches water at the outlet 14.

The additional fuel required to provide the back pressure of 0.012 inches across fuel orifice 24, is supplied from the main fuel valve 30. At idle, the signal of venturi 20 is equal to a minus pressure of 0.040 inches water when compared to the total air pressure as read at tube 72. In such case, the fuel pressure difference across fuel orifice 24 would be the venturi signal plus the fuel delivery pressure, or 0.052 inches of water. The pressure difference across venturi 20, which is the controlling orifice for the air, would be 0.040 inches of water. This would result in a richer air fuel ratio than the normal ratio as controlled by the values of venturi 20 and the fuel orifice 24. The fuel increase at idle would be approximately 15%, but quickly fades as the air demand increases. The venturi signal increases to the second power of air demand. If the air demand is doubled, the venturi signal would be 0.160 inches. The fuel signal would be 0.160 inches plus 0.012 inches or 0.172 inches. This is approximately 4% rich. The operational effect of the fuel pressure variations at inlet 16 is minimal. The valves of orifices 56 and 58 will be changed as the pressure at inlet 16 changes, but control diaphragm 70 must always float, provided there is ample pressure to open valve 30. As a fuel pressure loss occurs, less fuel flows across orifices 56 and 58 resulting in a pressure decrease across screw 90, but equally increasing the pressure at outlet 14 to float the control diaphragm 70, just as an increase fuel pressure increases the quantity across orifices 56 and 58. This increases the pressure difference across screw 90, lowering the pressure at outlet 14.

The fuel limiting factor of this device is not the physical size of the unit or even the main fuel valve size, but the size of the outlet 24 as it relates to the size of venturi 20, and the ratio and density factor of the fuel compared to the air. However, there is an advantage of oversized fuel valve in this type of device. The larger the fuel valve, the lower the inlet pressure can be, provided control can be established and maintained over the entire design pressure range.

This unit of FIG. 1 provides the ability to handle broad inlet pressure variations. The lack of diaphragm displacement and inertia, provides very good engine speed and load response, even though the system is very well dampened with orifices.

The control force ratio between the control diaphragm 70 and the main fuel valve 30, is a function of the area of the control diaphragm 70, divided by the area of orifice 64, multiplied by the area of the amplifier diaphragm 77, divided by the area of orifice 76a through seat 76, multiplied by the area of the main fuel valve diaphragm 86, divided by the area of the main fuel valve 30. A force ratio of diaphragm 70 to valve 30 of one hundred thousand to one is very easily achieved so it is easy for diaphragm 70 to manipulate valve 30 and with virtually no movement of the diaphragms. Diaphragm 70 simply responds to the condition of the fuel at outlet 14 as compared to the condition of the air at tube 72, and so positions itself over orifice 64 to maintain the proper opening of valve 30. The flow of pilot fuel from orifices 56 and 58 can join either upstream of adjustment 90 as shown or the pilot charge from the amplifier orifice 58 may join the fuel from orifice 56 downstream of screw 90.

Figure 2:
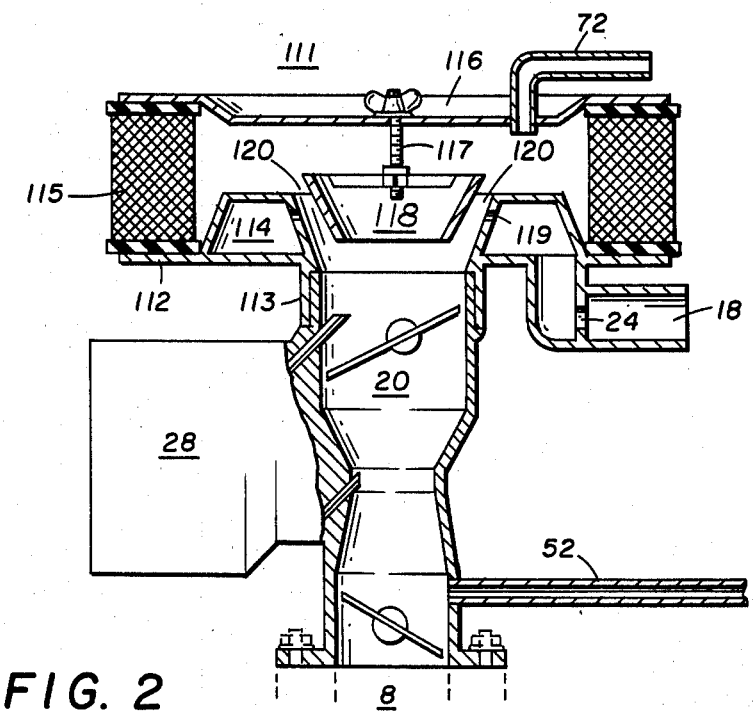
FIG. 2 is a sectional view of an adapter distributor system for two fuels.
Figure 3:
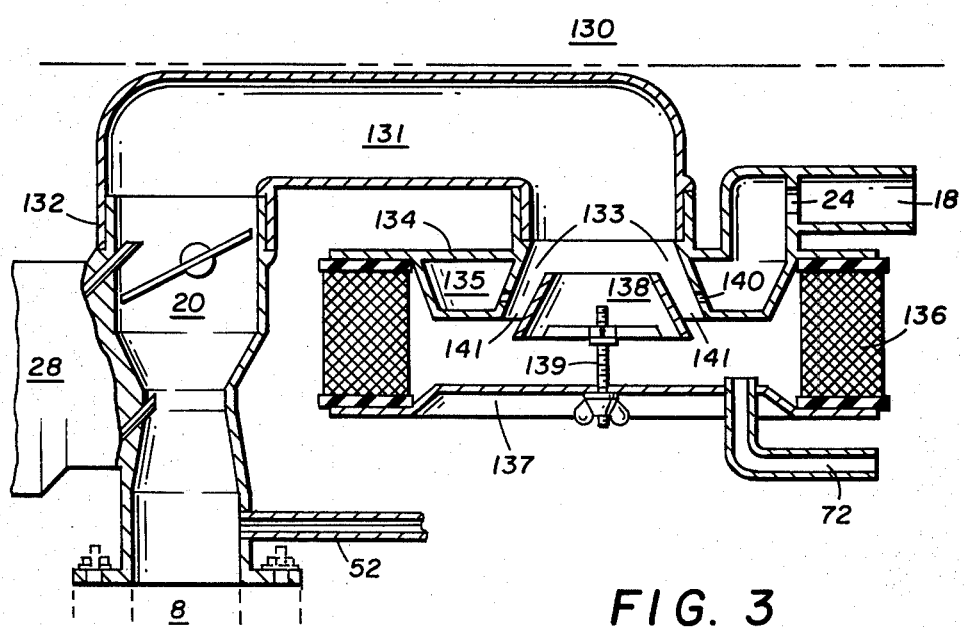
FIG. 3 is a sectional view of another adapter distributor system for two fuels.

FIGS. 2 and 3 illustrate hat-type adaptors mounted on top of gasoline carburetors. The use of this type of adaptor provides for a simple quick adaptation of the control unit shown in FIG. 1 to more complex carburetor units such as four-barrel carburetors.

Referring to FIG. 2, a hat-type adaptor 111 includes a support disc 112 having a central cylindrical port extension 113 which mates with and is mounted on the upper end of the throat structure 20 of FIG. 1. Throat structure 20 is associated with carburetor 28 to provide flow of liquid fuel to the throat structure 20 on demand for mixture with gaseous fuel coupled into the system by way of the adaptor 111.

Adaptor 111 has an annular chamber 114 which is formed on disc 112. An air filter of cylindrical form is supported on plate 112 and is clamped in place by an upper plate 116. A bolt 117 serves to anchor plate 116 to a fixed internal baffle 118 in adaptor 111.

The control unit of FIG. 1 is connected into the adapter 111 by way of channel 18, FIG. 1 which leads to the metering orifice 24, FIG. 2. Gaseous fuel drawn into the adaptor by way of tube 18 and orifice 24 enters into the airstream by way of discharge ports 119. Chamber 68a of FIG. 1 is connected to the adaptor 111 by way of tube 72. The vacuum connection 52 of FIG. 1 may be made to any suitable engine intake manifold in order to communicate with chamber 46b of FIG. 1.

Air from outside is drawn into the system by way of filter 115 and passes downward through venturi passage 120, which is in the form of an annular passage between the chamber 114 and baffle 118. It is to be understood means (not shown) support baffle 118 from the disc 112 so that the venturi passage 120 is fixed and serves to draw fuel through the metering orifice 24 into the carburetor system.

It is understood that the adaptor of FIG. 2 would be used in connection with carburetors where there is ample hood room. FIG. 3 illustrates a further embodiment of an adaptor where less hood room is available than in the case where the system of FIG. 2 is to be used.

Referring to FIG. 3, an adaptor 130 comprises a U-shaped pipe 131, one end of which telescopes over the upper end of the venturi structure 20 of FIG. 1. Carburetor 28 of FIG. 1 is coupled to supply liquid fuel through the venturi structure 20 to the engine 8. The opposite end 133 of the U-shaped tube 131 supports an upper plate 134, which is circular in form and which includes an annular chamber 135. An air filter 136 in the form of a short cylinder is secured to plate 134 by a bottom cover 137 which is secured to baffle 138 by way of a bolt 139.

The control unit of FIG. 1 is connected into the system of FIG. 3 by way of the tube 18 which leads to the metering orifice 24, thereby supplying gaseous fuel to the annular chamber 135. The gaseous fuel is delivered from chamber 135 by way of discharge ports 140. Air is drawn into the system through filter 136 and passes through the venturi passage 141. Chamber 68a of the control unit of FIG. 1 is connected into the adaptor unit by way of tube 72. The vacuum connection to chamber 46b may be made to any suitable engine intake manifold connection. As shown, the vacuum connection 52 connects into the venturi structure 20.

Having described the invention in connection with certain specific embodiments thereof, it is to be understood that further modifications may now suggest themselves to those skilled in the art and it is intended to cover such modifications as fall within the scope of the appended claims.

I claim:

1. A device for controlling the flow of fuel gas from a fuel gas source to an engine in response to a variable level vacuum generated by said engine, comprising:
   a conduit connecting the vacuum input port of said engine to said fuel gas source;
   a main valve disposed in said conduit for regulating the flow of said fuel gas; and
   diaphragm main valve control means in fluid communication with said conduit for operating said main valve in response to the level of said vacuum, comprising
   control diaphragm means for producing variations in pressure in said gas in response to said changes in the vacuum; and
   amplifier diaphragm means for amplifying said variations in pressure to drive said main valve.

2. The device in claim 1 wherein said amplifier diaphragm means comprises:
   a chamber in fluid communication with said conduit and with said main valve control means; and
   a diaphragm disposed in said chamber and adapted to actuate said control diaphragm means.

3. The device in claim 1 and further comprising:
   a passage in fluid communication with said conduit upstream from said main valve and leading to said main valve control means; and
   valve means for opening said passage in response to said vacuum.

4. A device for controlling the flow of gas in response to a vacuum, comprising:
   a housing having
   a bore for conveying said gas therethrough in response to the vacuum;
   a main valve disposed in said bore for regulating the flow of gas;
   a control diaphragm unit disposed in said housing, in fluid communication with said bore, and responsive to changes in the vacuum to open and close said main valve; and
   amplifying diaphragm structure disposed in said housing for actuating said main valve in response to said control diaphragm unit.

5. The device in claim 4 wherein said amplifying structure comprises:
   structure forming a first chamber in said housing which is divided by a first diaphragm;
   structure forming a second chamber in fluid communication with said first chamber and divided by a second diaphragm, said second diaphragm driving said main valve in response to said control diaphragm unit; and
   structure forming a passage for providing fluid communication between both of said chambers and said bore upstream and downstream of said main valve.

6. The device in claim 5 and further comprising a valve for opening and closing said passage in response to the vacuum.

7. The device in claim 5 and further comprising adjusting means downstream of said first chamber for altering the flow of gas through said passage.

8. The device in claim 5 and further comprising means providing fluid communication between said control diaphragm and the vacuum.

9. A device for controlling the mixture of a gas from a pressurized source and air in response to action of a vacuum operative to draw air into a venturi structure, comprising:
   a housing having
   a bore for conveying said gas to said venturi structure;
   a main valve for control of the flow of gas through said bore;
   structure forming a first chamber having a main diaphragm dividing said first chamber and connected on a first side to the source of said gas and on the second side to said venturi structure for applying to said second side of said main diaphragm variations in pressure corresponding to the rate of flow of air drawn into said venturi structure;
   structure forming a second chamber having an amplifier diaphragm dividing said second chamber and adapted to amplify said variations in pressure; and
   structure forming a third chamber having a control diaphragm in fluid communication with said second chamber for actuating said main valve in response to said amplified variations in said gas pressure.

10. The device in claim 9 and further comprising:
    a pilot fuel valve for controlling the flow of gas to said main, amplifier and actuator diaphragms; and
    a diaphragm for actuating said pilot fuel valve in response to the vacuum.

11. The device in claim 9 and further comprising means defining a passage connecting said first and second chambers with said bore.

12. A device for controlling the mixture of a pressurized gas and air in response to a vacuum produced in a venturi having a throat containing a butterfly valve, comprising:
    housing having a bore connecting the source of said gas with said venturi upstream of said butterfly valve;

a main valve for regulating the flow of said gas to said throat;

structure forming a first chamber having a main diaphragm dividing said first chamber into upper and lower first chamber halves with said main diaphragm connected to said main valve and with said lower first chamber half in fluid communication with said bore downstream of said main valve;

structure forming a second chamber having an amplifier diaphragm dividing said second chamber into upper and lower second chamber halves with pressure in said upper first chamber half controlled by said amplifier diaphragm;

structure forming a third chamber having a control diaphragm dividing said third chamber into upper and lower third chamber halves with means to apply pressure at the mouth of said venturi to the upper third chamber half;

means connecting said upper first chamber half with the throat upstream of said bore for applying pressure responsive to the vacuum to said control diaphragm;

structure forming a passage connecting said upper chamber half to said bore upstream of said main valve;

structure forming control passage connecting said upper first chamber half and said upper second chamber half with said bore upstream of said main valve;

a pilot fuel valve for opening and closing said control passage; and diaphragm means responsive to reduced pressure in said venturi downstream of said butterfly valve for controlling said pilot fuel valve.

* * * * *